(12) United States Patent
Ginja et al.

(10) Patent No.: US 10,518,726 B2
(45) Date of Patent: Dec. 31, 2019

(54) MOTOR VEHICLE BUMPER BEAM COMPRISING A CROSS-MEMBER AND A SHOCK ABSORBER

(71) Applicant: Compagnie Plastic Omnium, Lyons (FR)

(72) Inventors: Stéphane Ginja, Amberieu en Bugey (FR); Anthony Chene, Jujurieux (FR)

(73) Assignee: Compagnie Plastic Omnium (FR)

( * ) Notice: Subject to any disclaimer, the term of this patent is extended or adjusted under 35 U.S.C. 154(b) by 0 days.

(21) Appl. No.: 16/061,135

(22) PCT Filed: Dec. 8, 2016

(86) PCT No.: PCT/FR2016/053263
§ 371 (c)(1),
(2) Date: Jun. 11, 2018

(87) PCT Pub. No.: WO2017/098155
PCT Pub. Date: Jun. 15, 2017

(65) Prior Publication Data
US 2018/0361967 A1    Dec. 20, 2018

(30) Foreign Application Priority Data
Dec. 11, 2015  (FR) ...................................... 15 62168

(51) Int. Cl.
*B60R 19/24*  (2006.01)
*B60R 19/34*  (2006.01)

(52) U.S. Cl.
CPC .............. *B60R 19/24* (2013.01); *B60R 19/34* (2013.01); *B60R 2019/247* (2013.01)

(58) Field of Classification Search
CPC .... B60R 19/34; B60R 19/24; B60R 2019/247
USPC ................................................... 293/133, 154
See application file for complete search history.

(56) References Cited

U.S. PATENT DOCUMENTS

| | | | |
|---|---|---|---|
| 6,318,775 B1 * | 11/2001 | Heatherington | ........ B60R 19/18 293/120 |
| 8,157,066 B2 * | 4/2012 | Murayama | .............. B60R 19/18 188/371 |
| 2009/0160204 A1 * | 6/2009 | Czopek | ................... B60R 19/18 293/133 |
| 2015/0151698 A1 | 6/2015 | Lee et al. | |

(Continued)

FOREIGN PATENT DOCUMENTS

| | | |
|---|---|---|
| DE | 3700854 A1 | 7/1987 |
| DE | 19533366 A1 | 3/1997 |

(Continued)

OTHER PUBLICATIONS

Machine Translation of DE20206113730, printed from the EPO website, Jun. 17, 2019.*

*Primary Examiner* — Jason S Morrow
(74) *Attorney, Agent, or Firm* — St. Onge Steward Johnston & Reens, LLC

(57) ABSTRACT

According to the invention, both the cross-member and the shock absorber include an upper surface and a lower surface, and the bumper beam has an element for attaching the cross-member to the shock absorber, the attachment element including a strap connecting the lower and/or upper surfaces of the cross-member and the shock absorber.

23 Claims, 2 Drawing Sheets

(56) References Cited

U.S. PATENT DOCUMENTS

| | | | | |
|---|---|---|---|---|
| 2016/0001722 A1* | 1/2016 | Nickel | ................... | B60R 19/18 |
| | | | | 293/120 |
| 2016/0332587 A1* | 11/2016 | Ginja | ..................... | B60R 19/18 |
| 2017/0203707 A1* | 7/2017 | Fuerst | .................... | B60R 19/34 |
| 2017/0240127 A1* | 8/2017 | Kutscher | ................ | B60R 19/48 |

FOREIGN PATENT DOCUMENTS

| | | | | |
|---|---|---|---|---|
| DE | 19603953 C1 | | 4/1997 | |
| DE | 102016113730 A1 | * | 6/2019 | ............ B62D 21/03 |
| FR | 2842152 A1 | | 1/2004 | |
| GB | 2186240 A | | 8/1987 | |

* cited by examiner

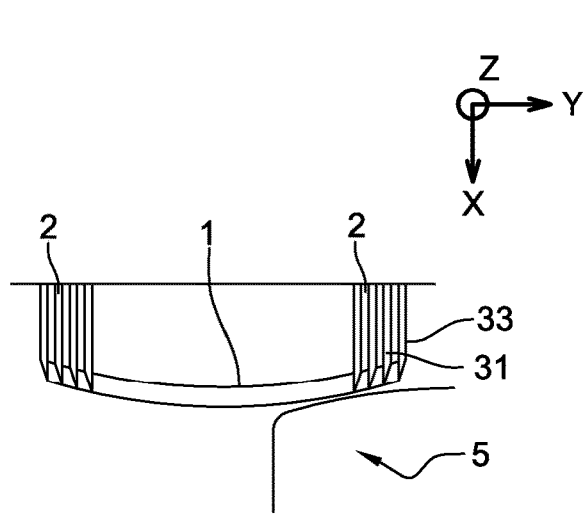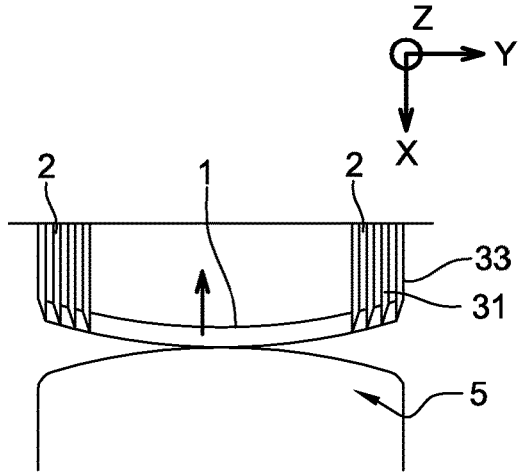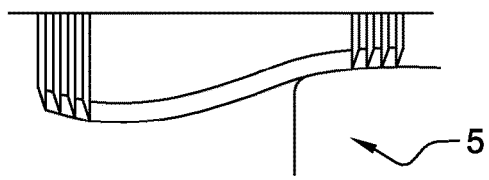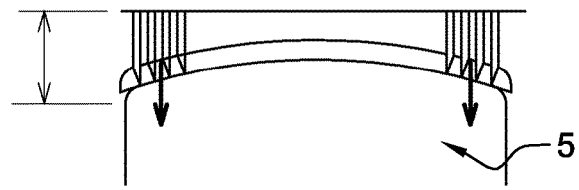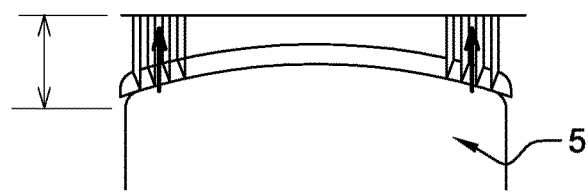
Fig. 5
Fig. 6

MOTOR VEHICLE BUMPER BEAM COMPRISING A CROSS-MEMBER AND A SHOCK ABSORBER

FIELD OF THE INVENTION

This invention relates to an assembly for a motor vehicle, more precisely a bumper beam generally comprising a cross-member and two absorbers each being connected to the vehicle by attachment plates.

BACKGROUND OF THE INVENTION

Generally, such a bumper beam comprises a curved cross-member, consisting of a structural or semi-structural element, for example a profile made of metal or composite material, and two side shock absorbers called "crash boxes", such absorbers being shock absorption modules whose function is to absorb energy by deformation in case of shocks, especially during "Danner" or "Bumper test" insurance type shocks.

The shock absorbers are configured to be arranged between the cross-member and two longitudinal members of the vehicle. The absorbers are therefore attached to the cross-member by an assembly such as riveting, bonding, welding, or by spraying an adhesive at the interface, etc. The aim is to preserve the mechanical integrity of the connection between the beam and the absorbers during any type of shock.

One difficulty lies in the fact that the cross-member may in some cases be stressed in at least two different ways against shock absorbers. Firstly, it may be subjected to compressive stress on the side during a "Danner" type shock, during which the vehicle is for example projected at 15 km/h against a rigid wall inclined at 10° with 40% overlap. The aim is thus to obtain maximum absorption by the shock absorber and in this case the cross-member works in compression at the stressed absorber. The absorbers are also subjected to compressive stress. Note that, concerning the cross-member as a whole, a first mode of deformation of the cross-member in bending takes place before compression of the absorbers. Secondly, the cross-member may be subjected to bending stress, during a "pole" shock, or in its centre during a "Bumper test" type shock, also called new "IIHS" insurance shock during which the vehicle is projected at 10 km/h, being centered on a rigid shock impactor, similar to a barrier, consisting of a deformable element representing the rigidity of the shock system of a second vehicle in case of head-on impact. In this case, and in reaction to the centered impact, the shock absorbers are first subjected to tensile stress towards the front, especially when the beam is initially curved and loses its curve by deformation at the start of the shock, since the ends of the cross-member tend to detach from the side absorbers due to the reaction force. The absorber is in fact attached to the rear of the longitudinal member, generally by a plate, whereas the front of the absorber is pulled forward by the ends of the cross-member. This phenomenon also exists in case of a straight, not curved, cross-member. Since each of the absorbers is rigidly attached to the vehicle by means of plates, an impact centered on the cross-member induces a tensile reaction force at the absorbers. Secondly, the shock absorbers are subjected to compressive stress towards the rear, when the cross-member is no longer bent. Due to these various load cases, the connection between the cross-member and the absorbers is highly stressed, and the cross-member could become detached from the shock absorbers making the bumper beam less efficient and resulting in greater damage than that accepted by insurance companies.

SUMMARY OF THE INVENTION

The main objective of the invention is to overcome these disadvantages by proposing a bumper beam comprising a cross-member and a shock absorber providing a stronger connection between the cross-member and the shock absorber.

Thus, the invention relates to a bumper beam for motor vehicle comprising a cross-member and at least one shock absorber, both the cross-member and the shock absorber having an upper surface and a lower surface, the bumper beam comprising an element for attaching the cross-member to the shock absorber, the attachment element comprising a strap connecting the upper surfaces of the cross-member and the shock absorber and/or the lower surfaces of the cross-member and the shock absorber.

Thus, it is proposed to add an attachment element to make an additional connection between the shock absorber and the cross-member to anchor the shock absorber securely to the cross-member, and therefore obtain better mechanical behavior in case of shocks. In particular, the strap shape of this attachment element provides additional tear resistance when the shock absorber is subjected to tensile stress and, by pulling the cross-member against the end of the absorber, prevents the cross-member from detaching from the shock absorber in case of bending (central), or even "straightening" of the bumper beam during a "Bumper test" type shock or a pole shock. In this case, the strap shape withstands a tensile force exerted by the ends of the bumper beam towards the front of the vehicle. Furthermore, the strap shape increases the contact surfaces between the cross-member and the shock absorber, which also strengthens the connection by surface, mechanical and/or chemical adhesion. It is understood that the strap, like a possible reinforcement rib, extends each side of the contact interface between the shock absorber and the cross-member. In case of an absorber made by molding (particularly by injection), the attachment element may advantageously be made simultaneously during this molding operation.

"Bumper beam" means an assembly comprising a cross-member, at least one "crash box" type absorber, generally two, and preferably two plates for attaching each absorber to a longitudinal member of the vehicle. Furthermore, a "cross-member" (or bar) generally designates a rigid elongated structure extending transversely across the vehicle between two points to which it is attached. The longitudinal direction (X) of the motor vehicle means the direction in which the motor vehicle moves, the transverse direction (Y) and vertical direction (Z) being perpendicular to the longitudinal direction. Generally, the cross-member is curved and extends substantially in the transverse direction (Y) of the vehicle. It is understood that the shock absorber is a shock absorption module whose function is to absorb energy by deformation in case of shocks, preferably a lateral absorber of "crash box" type located at least partially in the extension of a longitudinal member of the vehicle, each being designed to absorb the energy of shocks directed mainly in the axis of the longitudinal member which carries it.

The bumper beam may further comprise one or more of the following characteristics, taken alone or in combination.

The strap connects the upper surface and/or lower surface of the shock absorber with a front part of the cross-member. Thus, the strap extends from the absorber to a front part of the cross-member, so as to form an attachment system, providing better tear resistance of the cross-member relative to the absorber.

The strap encircles the cross-member, i.e. it connects the lower surface and upper surface of the shock absorber, going in front of the bumper beam. The attachment of the cross-member to the shock absorber is therefore improved, the strap forming a belt in front of the cross-member, comparable to a barrel strapping on a transverse plane of the cross-member. In other words, the strap joins the upper and lower surfaces of the absorber continuously, going in front of the front face of the cross-member. Advantageously, the strap may extend over the upper surface and/or lower surface of the shock absorber over the entire length in the longitudinal direction X of the shock absorber, or even go behind the shock absorber if the strap is molded with an attachment plate of the shock absorber, so as to completely encircle the assembly of the cross-member and the shock absorber in the direction X.

On the front face of the cross-member, the strap follows (takes) all the shapes of the cross-member, these shapes being flat or rounded, convex or concave, as well as corners. This applies in particular if the cross-member has an "omega-shaped" (Ω-shaped) cross-section.

The strap is connected to a plate attaching the shock absorber to a longitudinal member of the vehicle. This plate forms a bearing surface for the shock absorber and attaches it to the longitudinal member. Preferably, the strap is made in one piece with the plate.

The bumper beam comprises several straps arranged symmetrically in the Y direction relative to the median plane in the Y direction of the absorber.

The strap thickness is between 2 and 4 mm, preferably approximately 2.2 mm. This thickness corresponds for example to the dimension of the strap in the Z direction of the vehicle.

The strap width is between 5 and 20 mm, preferably approximately 10 mm. This width corresponds for example to the dimension of the strap in the Y direction of the vehicle.

The attachment element comprises at least two straps partially separated from each other, possibly completely separated from each other, distributed over the width in the Y direction of the absorber or of the cross-member, each encircling the cross-member locally. Thus, the attachment is strengthened while optimizing the quantity of material, since the entire bumper beam is not necessarily covered by a single continuous strap over the width of the absorber. It is understood that the two straps are opposite a given lateral absorber.

The partially separated straps are connected together transversely by bridges, themselves separated from each other. The bridges thus form a kind of mesh/grid.

The strap is continuous over the width of the shock absorber.

Both the cross-member and the shock absorber have at their ends in the Y direction a lateral surface, the attachment element further comprising a lateral belt connecting the lateral surfaces of the cross-member and the shock absorber. It is understood that the lateral surface of the cross-member connects the upper and lower surfaces of the cross-member. This surface may have a very limited area, covering only the material thickness of the free end of the cross-member, different from a full surface or flank also covering the hollow or concave spaces of the section located at the end. It is understood that the lateral surface of the shock absorber connects the upper and lower surfaces of the shock absorber. This lateral belt thus acts as a complement of the strap located on the upper and/or lower surface to keep the cross-member assembled to the shock absorber in case of compressive stress. This lateral belt thus provides resistance in addition to that of the straps preventing the cross-member from detaching from the shock absorber in case of tensile stress at the interface, i.e. in case of bending stress of the cross-member. This lateral belt further provides additional resistance in case of compressive stress of the cross-member and absorber assembly.

The lateral belt covers the lateral surface of the cross-member so as to connect the lateral surface of the shock absorber and a front surface of the bumper beam. Thus, a local effect of lateral strapping of the bumper beam is added, in addition to the upper and/or lower strapping of the strap connecting the lower and/or upper surfaces of the cross-member and the shock absorber. It is understood that the front surface of the bumper beam is located at the front of the vehicle, when considering the longitudinal direction of the vehicle.

The lateral belt forms a lateral flank entirely covering the lateral surfaces of the cross-member and the shock absorber. The presence of this lateral flank is particularly advantageous. Firstly, it forms a lateral frame favoring the connection by encapsulating the lateral surfaces of the cross-member and the shock absorber, and by increasing the resistance of the attachment element to compressive or tensile stress. Secondly, the thickness of the lateral flank compensates for the geometric dispersions of the cross-member, generally made in the form of an insert to which the absorber and the attachment element are overmolded, as well as the centering dispersions of the cross-member in an injection mold. Thus, the manufacturing tolerances are compensated by the lateral flank. For example, if the insert is shorter than the planned dimension, a standard dimension of the assembly is maintained by filling the space by increasing the thickness of the flank of the attachment element.

The thickness of the lateral flank is greater than 4 mm, preferably about 5 mm. The thickness corresponds to the average dimension of the lateral flank in the transverse direction (Y) of the vehicle. This thickness is particularly relevant for a bumper beam whose manufacturing tolerance over the length (transverse direction of the vehicle) is approximately +/−1 mm (millimeter) and whose centering tolerance in the mold is approximately +/−1 mm.

The shock absorber consists of a substantially parallelepipedic shape, having an attachment plate, intended to rest against a longitudinal beam of the motor vehicle, the attachment element being attached to this attachment plate, the attachment element preferably comprising a reinforcement rib extending between the attachment plate and the front of the attachment element. The reinforcement rib further reinforces the connection between the cross-member and the shock absorbers, in particular by keeping the shock absorber at right angles to the attachment plate. In addition, the reinforcement rib increases the energy absorption.

The attachment element is made in one piece with the shock absorber. This considerably reinforces the mechanical connection between the cross-member and the shock absorber. According to a particularly interesting application, the shock absorber may be overmolded directly on the cross-member. In addition, this means that in a single overmolding step, both the absorber and the attachment element can be manufactured around the cross-member.

The attachment element is obtained by overmolding the cross-member, possibly at the same time as overmolding the entire shock absorber. Overmolding can be used to produce an assembly made in one piece with strong connections. In addition, manufacturing by overmolding offers the advantage of combining the manufacture and assembly of these parts. Alternatively, the strap can be made of plastic or metal and/or by a glass fiber braid, which may in the two latter cases also be overmolded with plastic, to provide the strapping function.

The attachment element is made of metal or metal/plastic hybrid.

The bumper beam forms a front or rear shock module and further offers one or more of the functions chosen from the group comprising a lower protection beam for pedestrian, an attachment for a vehicle component such as an electrical component, a stiffener such as a motor vehicle door, roof or wing stiffener.

The cross-member is a profile having a cross-section of constant shape, for example an Ω (omega), U or W shape. The profile generally has a shape, preferably with a constant section in the Y direction (section taken in a plane perpendicular to the Y direction of the vehicle), made by pultrusion or extrusion, of metal or composite material. The profile is elongated in a direction corresponding to the transverse direction of the vehicle.

The invention further relates to a method for manufacturing a bumper beam comprising a cross-member and a shock absorber as defined above, comprising a step of overmolding the attachment element on the cross-member and on the shock absorber, this overmolding possibly being used to manufacture the shock absorber and the attachment element simultaneously.

BRIEF DESCRIPTION OF THE DRAWINGS

The invention will be better understood on reading the accompanying figures, which are given solely by way of example and not limiting in any way, in which:

FIG. 5 shows diagrammatic cross-sections in the transverse direction illustrating the mode of deformation of the bumper beam of FIG. 4 before and after a "Danner" type shock, and FIG. 6 shows cross-sections similar to FIG. 5 illustrating the mode of deformation of the bumper beam of FIG. 4 before, during and after a "Bumper test" type shock.

DETAILED DESCRIPTION OF THE INVENTION

Figure 1:
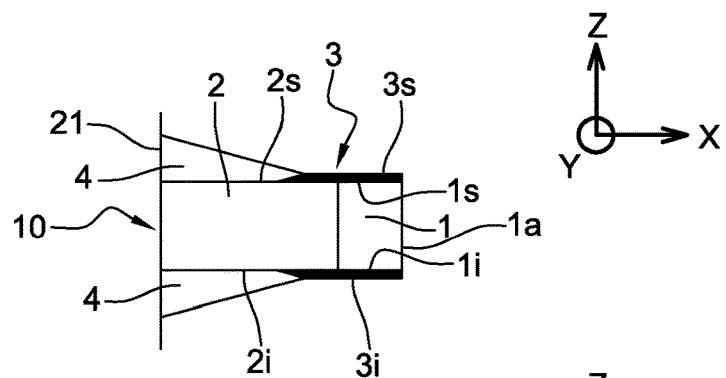
FIG. 1 is a diagrammatic cross-section in a plane XZ of the vehicle of a bumper beam comprising a cross-member and a shock absorber according to a first embodiment.

We now refer to FIG. 1, which shows a bumper beam 10 comprising a cross-member 1 and a shock absorber 2 for motor vehicle.

In the case of FIG. 1, the cross-member 1 is a profile of general shape curved towards the front X of the vehicle, but which may be straight, elongated in a longitudinal direction of the profile which corresponds to the transverse direction Y of the vehicle when the beam is mounted on the vehicle. The profile has a cross-section of constant shape, U-shaped in this example, and is made by pultrusion, extrusion (e.g. of aluminum), injection (e.g. an HTPC type beam) or by compression (e.g. a C-SMC type beam) or by folding and stamping sheet metal. The cross-member 1 is preferably made of metal or composite material, or comprises an insert made of metal or composite material which may also be overmolded. The shock absorber 2 has a substantially parallelepipedic shape, comprising an attachment plate or support plate 21 intended to rest against a longitudinal member of the motor vehicle. Both the cross-member 1 and the shock absorber 2 have an upper surface 1s, 2s, facing towards the top of the vehicle, and a lower surface 1i, 2i, facing the road.

The bumper beam 10 further comprises an element 3 for attaching the cross-member 1 to the shock absorber 2, in order to form a stronger connection between the cross-member 1 and the shock absorber 2. The attachment element 3 comprises an upper strap 3s connecting the upper surfaces 1s and 2s of the cross-member 1 and the shock absorber 2. It is understood that the attachment element 3 can alternatively or in combination comprise a lower strap 3i connecting the lower surfaces 1i and 2i of the cross-member 1 and the shock absorber 2. It is also understood that the attachment element 3 may take any form such as a single strap, several straps separated or partially separated in the transverse direction Y, or a surface covering the entire upper or lower junction line of the cross-member 1 and the shock absorber 2.

Figure 2:
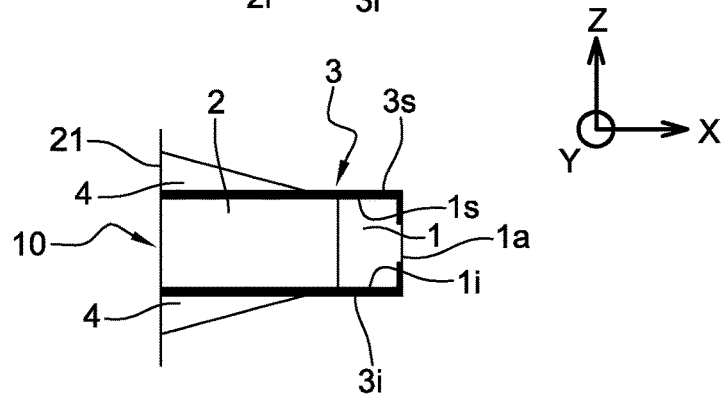
FIG. 2 is a cross-section similar to FIG. 1 of a bumper beam according to a second embodiment.

The attachment element 3 shown on the embodiment of FIG. 2 has a more advantageous configuration. In this example, the attachment element 3 partially encircles the front face of the cross-member 1, extending over the entire length of the lower 1i and upper 1s surfaces of the cross-member 1 to a part of a front surface 1a of the cross-member 1, so as to have a lower strap 3i and an upper strap 3s each having a substantially L-shaped (angle) cross-section according to a plane Y of the vehicle. This L shape is advantageous, firstly since it increases the contact surface between the three elements, i.e. the cross-member 1, the shock absorber 2 and the attachment element 3, so as to strengthen the connection between them and increase the compressive strength, and secondly since the extension of the attachment element 3 on the front surface 1a of the cross-member 1 provides a hooking effect hooking the cross-member 1 to the shock absorber 2, preventing the cross-member 1 from detaching from the shock absorber 2 in case of tensile stress. It is understood that the cross-section of the attachment element 3 may take other shapes, the hooking effect on the front surface 1a being particularly interesting.

Figure 3:
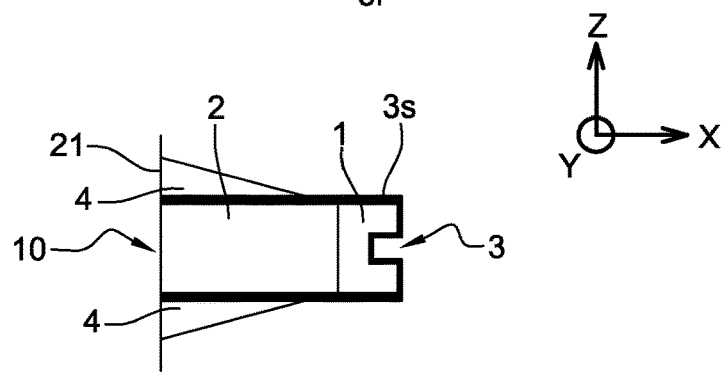
FIG. 3 is a cross-section similar to FIG. 1 of a bumper beam according to a third embodiment.

The embodiment of FIG. 3 shows an attachment element 3 with a preferred configuration. In this example, the cross-member 1 preferably has a W-shaped or Ω-shaped ("omega-shaped") cross-section and the attachment element 3 has a strap 31 which completely encircles the cross-member 1, connecting the lower surface 2i and the upper surface 2s of the shock absorber 2, going continuously in front of the front face of the cross-member 1, i.e. the strap 31 goes continuously in front of the front face and preferably takes the shape or is pressed against the entire shape/the sections of this front face. Furthermore in this example, the strap 31 in addition to encircling the surfaces 1s, 1a and 1i of the bumper beam also extends along the entire length of the lower 2*i* and upper 2*s* surfaces of the shock absorber 2 up to the attachment plate 21, to which it is attached or with which it is made in one piece. This shape of the attachment element 3 is highly advantageous since the assembly of the cross-member 1 and of the shock absorber 2 is completely encircled, like the strapping of a barrel, according to a transverse plane (in the Y direction) of the cross-member 1. More specifically, the attachment element 3 and the attachment plate 21 form a closed cross-section around the cross-member 1 and the shock absorber 2.

Figure 4:
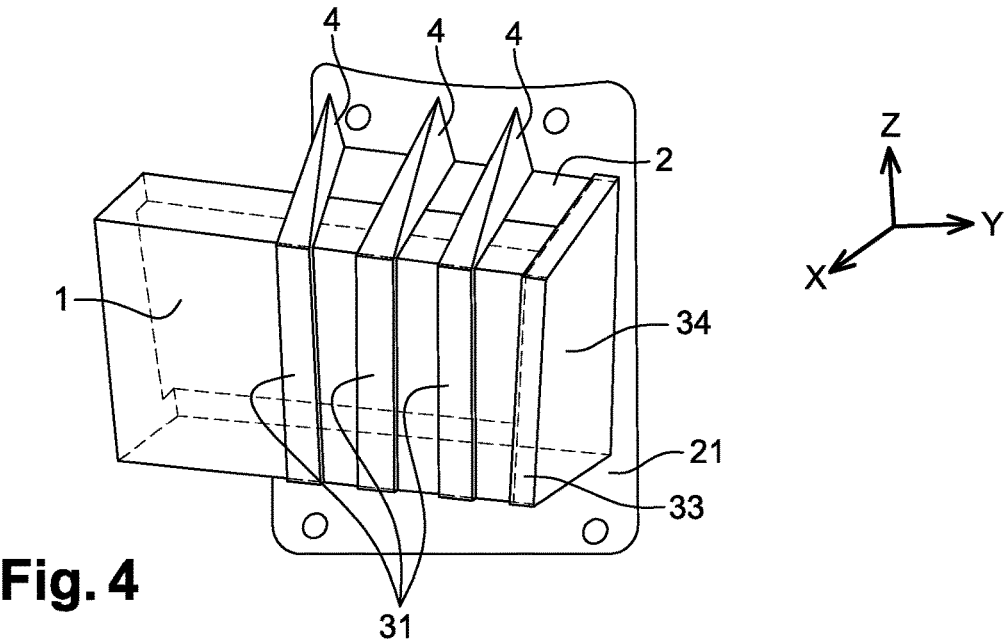
FIG. 4 is a partial diagrammatic front view of a bumper beam according to a fourth embodiment.

On the embodiment of FIG. 4, the attachment element 3 comprises several straps 31 substantially parallel to each other, more precisely three, distributed in the transverse direction Y of the vehicle and completely separated from each other. This optimizes the quantity of material and the reinforcement effect of the mechanical connection and of the attachment.

Furthermore, the attachment element 3 comprises in this example a lateral belt comprising in this example a lateral strap 33 and a lateral flank 34, and connecting the lateral surfaces of the cross-member 1 and the shock absorber 2. More specifically in this case, the lateral belt 33, 34 fully covers the lateral surfaces of the cross-member 1 and the shock absorber 2, as shown on FIG. 4. The presence of this lateral belt is particularly advantageous. Firstly, it forms a lateral frame favoring adhesion by encapsulating the lateral surfaces of the cross-member 1 and the shock absorber 2. Secondly, the lateral belt compensates for the geometric dispersions of the cross-member 1, generally made in the form of an insert to which the attachment element 3 is overmolded, as well as the centering dispersions of the cross-member 1 in the injection mold. The thickness of the flank 33 is preferably greater than 4 mm.

It is understood that the lateral belt can take different forms, in particular either the strap 33 or the straps 31, or the lateral flank 34 can be thin or have a flat surface. Preferably, the strap 33 will be wider than the straps 31, and the straps less and less wide going towards the centre in Y0 of the beam, this configuration corresponding to the levels of mechanical stress to which the beam is subjected, higher at the ends.

According to one embodiment, the attachment element can be a separate part of the shock absorber 2, being overmolded thereon. Thus, the attachment element forms a frame added on top of the shock absorber.

On the embodiment of FIG. 4, the attachment element 3 is made in one piece with the shock absorber 2. This considerably reinforces the mechanical connection between the cross-member 1 and the shock absorber 2. Thus, according to a particularly interesting application, the shock absorber 2 is overmolded directly behind the cross-member 1, at the same time as overmolding the attachment element 3. This means that in a single overmolding step, both the absorber 2 and the attachment element 3 can be manufactured around the cross-member 1.

Advantageously, the attachment element 3 comprises a reinforcement rib 4 extending between the attachment plate 21 and the front of the attachment element 3, as shown on FIGS. 1 to 4.

Preferably, the bumper beam 10 comprising the cross-member 1 and the shock absorber 2 forms a front or rear shock module and further provides one or more of the functions chosen from the group comprising a lower protection beam for pedestrian, an attachment for a vehicle component such as an electrical component, a stiffener such as a motor vehicle door, roof or wing stiffener.

It is understood that the method for manufacturing the bumper beam 10 comprises a step of overmolding the attachment element 3 on the cross-member 1 and the shock absorber 2, this overmolding operation possibly being used to manufacture the shock absorber 2 and the attachment element 3 simultaneously.

As can be seen on the drawing at the bottom of FIG. 5, in case of a Danner type shock with an obstacle 5 having an impact on the side of the vehicle, the cross-member 1 deforms, thereby absorbing some of the energy of the shock and one of the lateral absorbers 2 works in compression. The drawing at the top of FIG. 5 shows the elements before the shock. The attachment element 3 contributes to the energy absorption by increasing the contact area between the beam and the absorber 2.

Furthermore, in case of a "Bumper test" type shock, shown on FIG. 6, during a head-on impact with an obstacle 5', the cross-member 1 which was initially curved before the shock (top drawing) starts to deform by losing its curve (middle drawing), which exerts a tensile force on the lateral absorbers 2, then at the end of the shock (bottom drawing), exerts a pressure on the absorbers by compressing them. The attachment element 3 maintains in particular a strong connection between the cross-member 1 and the absorbers 2 during these two steps. This also applies in case of a straight bumper beam.

The invention is not limited to the embodiments described above and other embodiments will be clearly apparent to those skilled in the art.

The invention claimed is:

1. A bumper beam for motor vehicle comprising a cross-member and at least one shock absorber, both the cross-member and the shock absorber having an upper surface and a lower surface, wherein the bumper beam comprises an attachment element for attaching the cross-member to the shock absorber, the attachment element comprising at least two straps connecting the upper surfaces of the cross-member and the shock absorber and/or the lower surfaces of the cross-member and the shock absorber, the at least two straps being at least partially separated from each other, and distributed in the transverse direction, each encircling the cross-member locally.

2. The bumper beam according to claim 1, wherein at least one of the at least two straps connects the lower surface and the upper surface of the shock absorber, and is in front of the cross-member.

3. The bumper beam according to claim 1, wherein the at least two straps are connected together by bridges, themselves separated from each other.

4. The bumper beam according to claim 1, wherein at least one of the at least two straps is continuous over the width of the shock absorber.

5. The bumper beam according to claim 1, wherein both the cross-member and the shock absorber have a lateral surface, the attachment element further comprising a lateral belt connecting the lateral surfaces of the cross-member and the shock absorber.

6. The bumper beam according to claim 5, wherein the lateral belt forms a lateral flank entirely covering the lateral surfaces of the cross-member and the shock absorber.

7. The bumper beam according to claim 1, wherein the shock absorber is of a substantially parallelepipedic shape, having an attachment plate, intended to rest against a longitudinal beam of the motor vehicle, the attachment element being attached to this attachment plate.

8. The bumper beam according to claim 1, wherein the attachment element is made in one piece with the shock absorber.

9. The bumper beam according to claim 1, wherein the attachment element is obtained by overmoulding the cross-member.

10. The bumper beam according to claim 1, wherein the attachment element is made of metal or metal/plastic hybrid.

11. The bumper beam according to claim 1, forming a front or rear shock module and further providing one or more of the functions chosen from the group consisting of a lower protection beam for pedestrian, an attachment for a vehicle component, a roof stiffener or a wing stiffener.

12. The bumper beam according to claim 1, wherein the cross-member is a profile having a cross-section of constant shape.

13. A method for manufacturing a bumper beam for a motor vehicle, the method comprising a step of overmolding an attachment element on a cross member and at least one shock absorber, the bumper beam having the cross-member and the at least one shock absorber, both the cross-member and the shock absorber having an upper surface and a lower surface, wherein the bumper beam has the attachment element for attaching the cross-member to the shock absorber, the attachment element comprising at least two straps connecting the upper surfaces of the cross-member and the shock absorber and/or the lower surfaces of the cross-member and the shock absorber, the at least two straps being at least partially separated from each other, and distributed in the transverse direction, each encircling the cross-member locally.

14. The bumper beam according to claim 2, wherein the strap is continuous over the width of the shock absorber.

15. The bumper beam according to claim 1 wherein the at least two straps are completely separated from each other.

16. The bumper beam according to claim 5 wherein the lateral belt covers the lateral surface of the cross-member so as to connect the lateral surface of the shock absorber and a front surface of the bumper beam.

17. The bumper beam according to claim 6 wherein a thickness of the flank is greater than 4 mm.

18. The bumper beam according to claim 7 wherein the attachment element comprises a reinforcement rib extending between the attachment plate and front of the attachment element.

19. The bumper beam according to claim 9 wherein the attachment element is obtained by overmoulding the cross-member at the same time as overmoulding the entire shock absorber.

20. The bumper according to claim 11 wherein the attachment for a vehicle component is an electrical component and the stiffener is a motor vehicle door.

21. The bumper beam according to claim 12 wherein the constant shape is an omega ($\Omega$), U or W shape.

22. The bumper beam according to claim 12 wherein the cross-member is made of metal or composite material.

23. The method of claim 13 wherein the overmolding step is used to manufacture the shock absorber and the attachment element simultaneously.

* * * * *

UNITED STATES PATENT AND TRADEMARK OFFICE
CERTIFICATE OF CORRECTION

PATENT NO. : 10,518,726 B2  
APPLICATION NO. : 16/061135  
DATED : December 31, 2019  
INVENTOR(S) : Stéphane Ginja et al.

Page 1 of 1

It is certified that error appears in the above-identified patent and that said Letters Patent is hereby corrected as shown below:

On the Title Page

Item (71), Line 1:  
"Compagnie Plastic Omnium, Lyons"  
Should be changed to:  
–Compagnie Plastic Omnium, Lyon–

Signed and Sealed this  
Tenth Day of March, 2020

Andrei Iancu  
*Director of the United States Patent and Trademark Office*